(12) United States Patent
Mikami et al.

(10) Patent No.: US 8,313,243 B2  
(45) Date of Patent: Nov. 20, 2012

(54) ROLLING BEARING AND SEAL FOR ROLLING BEARING

(75) Inventors: Hidenobu Mikami, Mie (JP); Yosuke Taguchi, Mie (JP)

(73) Assignee: NTN Corporation, Osaka (JP)

( * ) Notice: Subject to any disclaimer, the term of this patent is extended or adjusted under 35 U.S.C. 154(b) by 280 days.

(21) Appl. No.: 12/734,207

(22) PCT Filed: Oct. 20, 2008

(86) PCT No.: PCT/JP2008/068944  
§ 371 (c)(1),  
(2), (4) Date: Apr. 16, 2010

(87) PCT Pub. No.: WO2009/054338  
PCT Pub. Date: Apr. 30, 2009

(65) Prior Publication Data  
US 2010/0220943 A1 Sep. 2, 2010

(30) Foreign Application Priority Data

Oct. 26, 2007 (JP) .................................. 2007-279207  
Mar. 19, 2008 (JP) .................................. 2008-070653

(51) Int. Cl.  
*F16C 33/66* (2006.01)

(52) U.S. Cl. .................... 384/464; 384/462; 384/469

(58) Field of Classification Search ............... 384/462, 384/464, 469  
See application file for complete search history.

(56) References Cited

U.S. PATENT DOCUMENTS

| | | | | |
|---|---|---|---|---|
| 1,722,488 A | * | 7/1929 | Bott et al. ................... | 384/488 |
| 3,804,476 A | * | 4/1974 | Nakamura et al. ......... | 384/469 |
| 4,286,829 A | * | 9/1981 | Heemskerk ................. | 384/469 |
| 5,703,150 A | | 12/1997 | Ike | |
| 6,164,832 A | * | 12/2000 | Daughtry .................... | 384/473 |
| 2008/0085070 A1 | | 4/2008 | Hirata | |
| 2008/0166080 A1 | * | 7/2008 | Kawamura ................. | 384/462 |

FOREIGN PATENT DOCUMENTS

| | | |
|---|---|---|
| EP | 0 661 472 A1 | 11/1994 |
| EP | 0 719 781 A1 | 7/1996 |
| EP | 0 939 115 A1 | 9/1999 |
| EP | 1 775 488 A1 | 4/2007 |
| JP | 59-011398 A | 1/1984 |
| JP | 07-269564 A | 10/1995 |
| JP | 08-231568 A | 9/1996 |
| JP | 11-246885 A | 9/1999 |
| JP | 2002-130305 A | 5/2002 |
| JP | 2004-352858 A | 12/2004 |
| JP | 2005-155907 A | 6/2005 |
| JP | 2007-177949 A | 7/2007 |
| WO | WO2005/121578 A1 | 12/2005 |

OTHER PUBLICATIONS

PCT Search Report dated Dec. 2, 2008.

* cited by examiner

*Primary Examiner* — Thomas R Hannon  
(74) *Attorney, Agent, or Firm* — Hedman & Costigan, P.C.; James V. Costigan

(57) ABSTRACT

A rolling bearing (1) having an inner ring (2); an outer ring (3); a plurality of rolling elements (4) interposed between the inner ring (2) and the outer ring (3); a retainer (5) retaining the rolling elements (4); and a seal (6) provided at an open portion, of the inner ring (2) and the outer ring (3), which is disposed at both axial ends thereof. The rolling bearing (1) is lubricated with a grease (8) enclosed in a space, inside the bearing, which is constructed of the inner ring (2), the outer ring (3), the retainer (5), and the seal (6).

10 Claims, 1 Drawing Sheet

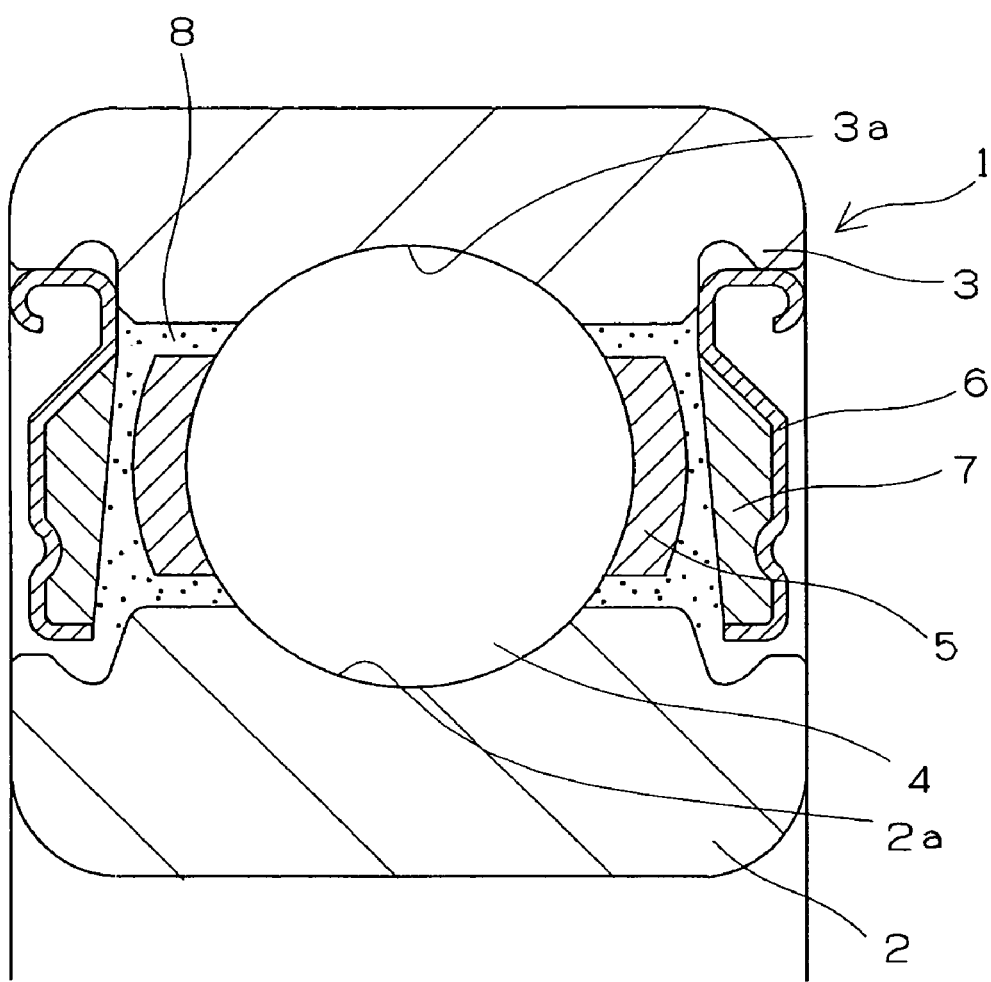

ROLLING BEARING AND SEAL FOR ROLLING BEARING

TECHNICAL FIELD

The present invention relates to a rolling bearing to be lubricated with grease and more particularly to a rolling bearing which has an excellent resistance to heat and a low temperature and can be preferably used for a long time even in a situation where a temperature change is rapid and a seal for the rolling bearing.

BACKGROUND ART

To construct various rotation-supporting members, a ball bearing which has a seal and is used by being lubricated with grease is widely used. In a known radial ball bearing which has a crown-type retainer and has a seal at both sides thereof, the axial center line of balls is shifted away from the axial center line of the inner ring and the outer ring and to the claw portion side of the crown-type retainer (see patent document 1). As the technique of improving lubricity and extending the life of a ball bearing which has a shield and is used by being lubricated with grease, the use of grease excellent in its heat resistance is known (see patent document 2).

But in the bearings described in the patent documents 1 and 2, there is a limit to the amount of the grease which can be filled in the space inside the bearing. Thus it is difficult to extend the life of the bearings further.

Patent document 1: Japanese Patent Application Laid-Open No. 2002-130305

Patent document 1: Japanese Patent Application Laid-Open No. 2004-352858

DISCLOSURE OF THE INVENTION

Problem to be Solved by the Invention

The present invention has been made to deal with the above-described problem. It is an object of the present invention to provide a rolling bearing in which efficacy provided by an auxiliary agent for grease can be maintained for a long time to extend its life and a seal for the rolling bearing.

Means for Solving the Problem

The rolling bearing of the present invention has an inner ring; an outer ring; a plurality of rolling elements interposed between the inner ring and the outer ring; a retainer retaining the rolling elements; and a seal provided at an open portion, of the inner ring and the outer ring, which is disposed at both axial ends thereof. The rolling bearing is lubricated with grease enclosed in a space, inside the bearing, which is constructed of the inner ring, the outer ring, the retainer, and the seal. In at least one of the members constructing the space inside the rolling bearing, an auxiliary agent for the grease is fixed to a surface, of at least one of the members, which is disposed at a side of a space inside the rolling bearing other than a sliding surface, of at least one of the members, on which the rolling elements slide. The auxiliary agent for the grease is fixed to a surface, of the seal, which is disposed at a side of the space inside the bearing.

The auxiliary agent for the grease includes an agent whose component melts in the grease (additive), thus assisting the grease directly and an agent which generates a gas or the like and decreases an oxygen concentration in the space within the bearing, thus preventing the oxidation deterioration of the grease and indirectly assisting the grease.

The auxiliary agent for the grease is fixed to the surface of at least one of the members with the auxiliary agent contained in a resin. The resin is epoxy resin.

In fixing the auxiliary agent for grease to the surface of at least one of the members, with the auxiliary agent contained in the resin, a ratio of a weight of the auxiliary agent to a total of a weight of the auxiliary agent and that of the resin is not less than 10 wt %.

The auxiliary agent for the grease is at least one agent or substance selected from among a foaming agent, an antioxidant, and a sublimate substance. The antioxidant is an amine antioxidant. The sublimate substance is at least one substance selected from among benzotriazole and derivatives thereof.

The foaming agent is at least one agent selected from among organic foaming agents. The organic foaming agent is azodicarbonamide.

The auxiliary agent for the grease is fixed to the seal of the present invention for the rolling bearing.

Effect Of The Invention

In the rolling bearing of the present invention having the above-described construction, in fixing the additive for the grease to the surface, of the seal or the like, which is disposed at the side of the space inside the bearing as the auxiliary agent for the grease, the additive contacts the grease enclosed in the bearing. Thereby the component of the additive melts in the grease. Therefore it is possible to continuously impart the efficacy of the component of the additive to the grease and maintain the efficacy provided by the additive for a long time.

The auxiliary agent for the grease is used in the form of the mixture in which the auxiliary agent is contained in the resin. Thus by bonding or applying the mixture to each surface, the mixture can be easily fixed thereto.

In using the foaming agent as the auxiliary agent for the grease, the foaming agent generates an inert gas at a high temperature and is capable of decreasing the concentration of oxygen present in the space inside the bearing. Thereby it is possible to suppress the oxidation deterioration of the grease and use the bearing for a long time.

In using the antioxidant as the auxiliary agent for the grease, the antioxidant absorbs oxygen present in the space inside the bearing. Thereby the antioxidant is capable of decreasing the concentration of oxygen present in the space inside the bearing. Consequently it is possible to prevent the oxidation deterioration of the grease for a long time.

In using the sublimate substance as the auxiliary agent for the grease, the sublimate substance sublimes in the space inside the bearing, and the space inside the bearing is filled with a generated gas. Thereby the sublimate substance is capable of decreasing the concentration of oxygen present in the space inside the bearing. Consequently it is possible to prevent the oxidation deterioration of the grease for a long time.

Because the auxiliary agent for the grease is fixed to the seal for the rolling bearing, the seal is capable of preventing the oxidation deterioration of the grease enclosed in the rolling bearing and extending the life of the rolling bearing in which the seal is used.

BRIEF DESCRIPTION OF THE DRAWINGS

FIG. 1 is a sectional view of a rolling bearing showing one embodiment of the rolling bearing of the present invention.

EXPLANATION OF REFERENCE NUMERALS AND SYMBOLS

| | |
|---|---|
| 1: | rolling bearing |
| 2: | inner ring |
| 3: | outer ring |
| 4: | ball (rolling element) |
| 5: | retainer |
| 6: | seal |
| 7: | mixture of auxiliary agent for grease and resin |
| 8: | grease |

BEST MODE FOR CARRYING OUT THE INVENTION

An embodiment of the present invention is described in detail below with reference to the drawings. FIG. 1 is a sectional view of a rolling bearing showing one embodiment of the rolling bearing of the present invention. As shown in FIG. 1, a rolling bearing 1 has an inner ring 2, an outer ring 3, a plurality of balls 4 interposed between the inner ring 2 and the outer ring 3, a retainer 5 having pockets retaining the balls 4 at regular intervals in the circumferential direction of the rolling bearing 1, an annular seal 6 provided at an open portion, of the inner ring 2 and the outer ring 3, which is disposed at both axial ends thereof. The rolling bearing 1 is lubricated with a grease 8 enclosed in a space, inside the bearing, which is constructed of the inner ring 2, the outer ring 3, the retainer 5, and the seal 6.

In this embodiment, as one of members constructing the space inside the bearing, a mixture 7 of an auxiliary agent for the grease and a resin is fixed to a surface, of the seal 6, which is disposed at the side of the space inside the bearing.

In using an additive for the grease as the auxiliary agent for the grease, when the grease 8 enclosed in the space inside the bearing moves in the space inside the bearing with the grease 8 receiving an external force such as a centrifugal force generated by a rotation of the rolling bearing 1, the grease 8 contacts the mixture 7 fixed to the surface, of the seal 6, which is disposed at the side of the space inside the bearing and receives the additive for the grease. In this manner, the grease 8 is used to lubricate the gap between the balls 4 and an outer ring raceway 3a of the outer ring 3 as well as an inner ring raceway 2a of the inner ring 2 and the gap between the balls 4 and the retainer 5.

The grease 8 which has captured the additive for the grease therein circulates inside the bearing with the additive in the grease being consumed on each sliding surface. Owing to the above-described repeated operation, the additive for the grease melts in the grease 8 and thus a specified concentration is kept. Therefore it is possible to maintain the efficacy provided by the additive for a long time.

Even in the case of an additive which cannot be added to the grease at a high concentration in terms of compatibility of the component of the additive with the component of the grease, the above-described structure allows the component of the additive to be gradually supplied to the grease, with the compatibility of the component of the additive with the component of the grease being maintained. Eventually it is possible to add the additive for the grease to the grease at a high concentration and maintain the efficacy provided by the additive for a long time.

When a foaming agent is used as the auxiliary agent for the grease, an inert gas is generated from the mixture 7 fixed to the surface, of the seal 6, which is disposed at the side of the space inside the bearing, with the result that the concentration of oxygen in the space inside the bearing decreases. Thereby oxidation deterioration of the grease 8 is suppressed. Similarly in using a sublimate substance as the auxiliary agent for the grease, the sublimate substance sublimes from the mixture 7, and the space inside the bearing is filled with a generated gas. Thereby the oxygen concentration decreases, which suppresses the oxidation deterioration of the grease 8 enclosed in the space inside the bearing.

In another embodiment of the present invention, as other portions to which the auxiliary agent for the grease is fixed, the surface (sliding surface on which balls slide is excluded) of the retainer 5, the outside surface (raceway surface is excluded) of the inner ring 2, and the inside surface (raceway surface is excluded) of the outer ring 3 are listed. The auxiliary agent for the grease may be fixed to one or a plurality of these portions.

The present invention is not limited to these embodiments, but appropriate modifications and improvements can be made. As the seal 6, in addition to a shield made of a steel plate, it is possible to use a seal reinforced with the steel plate. As the material of the seal, it is possible to use synthetic rubber such as nitrile rubber, acrylic rubber, silicone rubber, fluorine rubber, and the like.

As the grease to be enclosed in the rolling bearing of the present invention, it is possible to use grease which is usually used for the rolling bearing without a specific limitation. As base oil composing the grease, oil which is usually used as the base oil of lubricating grease can be used without a specific limitation. It is possible to use mineral oil such as paraffin oil, naphthenic oil, and the like; hydrocarbon synthetic oil such as polybutene oil, poly-α-olefin (hereinafter referred to as PAO), alkylbenzene oil, alkylnaphthalene oil, alicyclic compounds, and the like; non-hydrocarbon synthetic oil such as natural fat, polyol ester oil, phosphate ester oil, diester oil, polyglycol oil, silicone oil, polyphenyl ether oil, alkyldiphenyl ether oil, fluorinated oil, and the like. These base oils can be used singly or in combination of not less than two kinds thereof.

As a thickener, it is possible to list a metal soap thickener such as aluminum soap, lithium soap, sodium soap, lithium complex soap, calcium complex soap, aluminum complex soap, and the like; urea compounds such as diurea compounds, polyurea compounds, and the like; and fluororesin powder such as polytetrafluoroethylene resin, and the like. These thickeners can be used singly or in combination of not less than two kinds thereof.

The grease to be enclosed in the rolling bearing of the present invention may contain known additives as necessary. As the additives, it is possible to list a viscosity index improver such as polymethacrylate, polystyrene, and the like; a solid lubricant such as molybdenum disulfide, graphite, and the like; an anti-rust agent such as metal sulfonates, polyhydric alcohol ester, and the like; a friction-reducing agent such as organic molybdenum, and the like; an oiliness agent such as ester, alcohol, and the like; and an anti-wear agent such as phosphorous compounds. These agents can be used singly or in combination of not less than two kinds thereof. The following auxiliary agents to be fixed to members of the bearing may be contained in the grease in advance.

As the auxiliary agent for the grease to be fixed to the members constructing the space inside the bearing, it is preferable to select at least one agent or substance from among a foaming agent, an antioxidant, and a sublimate substance.

It is possible to use the foaming agent which generates an inert gas when it foams. It is preferable to use the foaming agent which starts foaming at a temperature higher than a temperature at which the bearing is operated. As the inert gas, nitrogen, carbon dioxide, and the like are preferable. As the foaming agent which generates such an inert gas, it is preferable to use at least one foaming agent selected from among organic foaming agents because the organic foaming agent hardly damages a rolling surface of the bearing even though it is erroneously applied thereto. As the organic foaming agent, azo compounds such as triazine compounds, hydrazine compounds, tetrazole compounds, azodicarbonamide are listed. It is preferable to use the azodicarbonamide of these organic foaming agents because it generates a larger amount of a gas. These foaming agents can be used singly or by mixing not less than two kinds thereof with each other.

As the antioxidant, phenol compounds and aromatic amine compounds are exemplified. A phenol antioxidant such as 2,6-di-t-butyl-4-methylphenol and the like and an amine antioxidant such as p,p'-dioctyldiphenylamine and the like are listed. It is preferable to use the amine antioxidant of these antioxidants because the amine antioxidant has a high solubility in the base oil of the grease. These antioxidants can be used singly or by mixing not less than two kinds thereof with each other.

As the antioxidant, a deoxidizer which is an oxygen-absorbing substance can be used. As the deoxidizer, ascorbic acid, ascorbates such as sodium ascorbate and potassium ascorbate, derivatives thereof, iron oxide, and the like are listed. These deoxidizers can be used singly or by mixing not less than two kinds thereof with each other.

As the sublimate substance, benzotriazole, its derivatives, naphthalene, its derivatives, benzophenone, and the like are listed. It is possible to use at least one sublimate substance selected from among the benzotriazole and its derivatives because steel is resistant to corrosion by these sublimate substances. These sublimate substances can be used singly or by mixing not less than two kinds thereof with each other.

In the rolling bearing of the present invention, the method of fixing the auxiliary agent for the grease to the members constructing the space inside the bearing is described below by exemplifying the case in which the auxiliary agent for the grease is fixed to the seal. The method of fixing the auxiliary agent for the grease to the surface, of the seal, which is disposed at the side of the space inside the bearing is not limited to a specific method, but it is possible to use:

(1) a method of bonding a resin layer to the surface, of the seal, which is disposed at the side of the space inside the bearing as an adhesive agent and bonding an auxiliary agent layer to the surface thereof.

(2) a method of layering the resin layer of above (1) and the auxiliary agent layer of above (1) one upon another and bonding them to the surface, of the seal, which is disposed at the side of the space inside the bearing with an adhesive agent.

(3) a method of bonding a mixture obtained by mixing an auxiliary agent and a resin with each other to the surface, of the seal, which is disposed at the side of the space inside the bearing with an adhesive agent.

(4) a method of bonding the mixture obtained by mixing the auxiliary agent and the resin which is the adhesive agent with each other to the surface, of the seal, which is disposed at the side of the space inside the bearing.

(5) a method of applying a resin paint composition in which the auxiliary agent is dissolved in a resin solvent to the surface, of the seal, which is disposed at the side of the space inside the bearing.

In using an additive for grease as the auxiliary agent for the grease, of these methods, it is preferable to use the methods (3) through (5) capable of making the distribution of the auxiliary agent in the mixture uniform and thereby stably supplying the additive for the grease to the grease moving in the space inside the bearing. It is especially preferable to use the method (5) capable of easily fixing the additive to the seal and preventing the additive from being eliminated from the grease despite the circulation thereof.

In using the foaming agent or the sublimate substance as the auxiliary agent for the grease, the methods (3) through (5) capable of making the distribution of the foaming agent or the like in the mixture uniform are also preferable. It is especially preferable to use the method (4) capable of easily fixing the foaming agent or the like to the seal.

In fixing the auxiliary agent for the grease to the members constructing the space inside the bearing with the auxiliary agent contained in the resin, it is preferable that the ratio of the weight of the auxiliary agent to the total of the weight of the auxiliary agent and that of the resin is not less than 10 wt %. At less than 10 wt %, the durability improvement effect is low, which is unpreferable.

As resins used to obtain a mixture of the resin and the auxiliary agent for the grease, it is possible to use those having adhesion to the seal such as a shield made of steel and a seal made of rubber and adhesion to the auxiliary agent for the grease without a specific limitation. For example, it is possible to list polyamide resin, polyethylene resin, polypropylene resin, epoxy resin, and the like. Of these resins, it is preferable to use the epoxy resin because the hardness of the epoxy resin is stable within a practical temperature range of the bearing.

EXAMPLES

Examples 1 through 8

The auxiliary agent for grease and the two-liquid epoxy resin (Araldite AR-S30 produced by NICHIBAN Co., Ltd) shown in table 1 were mixed with each other to obtain a resin paint composition of each example. Each resin paint composition was applied to the surface, of the seal, which is disposed at the side of the space inside the bearing and dried at 40° C. for 24 hours to obtain a seal to which the auxiliary agent for the grease was fixed. The seal was mounted on both sides of a rolling bearing (dimension of bearing: inner diameter: 20 mm, outer diameter: 47 mm, width: 14 mm) to obtain a specimen bearing. The specimen was used in a high-temperature and high-speed durability test shown below to measure the lifetime of the bearing. Table 1 shows the results.

<High-temperature and High-speed Test>

0.7 g of the grease shown in table 1 was enclosed in each of the obtained specimens. The rolling bearing was rotated at 10000 rpm in conditions where the temperature of an outside-diameter portion of an outer ring thereof was 150° C. and radial and axial loads were 67 N. A period of time till the rolling bearing was seized was measured as the lifetime thereof.

Comparative Examples 1 and 3

Without using the auxiliary agent for grease, only the two-liquid epoxy resin (Araldite AR-S30 produced by NICHIBAN Co., Ltd) was applied to the surface, of the seal, which is disposed at the side of the space inside the bearing and dried at 40° C. for 24 hours to obtain a seal to which the epoxy resin was fixed. The seal was mounted on both sides of the rolling bearing (dimension of bearing: inner diameter: 20 mm, outer diameter: 47 mm, width: 14 mm) to obtain a specimen bearing. The specimen was used in a high-temperature and high-speed durability test to measure the lifetime of the bearing. Table 1 shows the results.

Comparative Examples 2 and 4

A seal for which the auxiliary agent for grease nor the epoxy resin was used was mounted on both sides of the rolling bearing (dimension of bearing: inner diameter: 20 mm, outer diameter: 47 mm, width: 14 mm) to obtain a specimen bearing. The specimen was used in a high-temperature and high-speed durability test to measure the lifetime of the bearing. Table 1 shows the results.

motor, an air conditioner fan motor, and the like; rolling bearings for spindle motors of recording apparatuses such as a hard disk of a computer, CD-R and the like, rolling bearings for spindles of machine tools; and rolling bearings for general motors.

The invention claimed is:

1. A. rolling bearing comprising: an inner ring; an outer ring; a plurality of rolling elements interposed between said inner ring and said outer ring; a retainer retaining said rolling elements; and a seal provided at an open portion, of said inner ring and said outer ring, which is disposed at both axial ends thereof, said rolling bearing being lubricated with grease enclosed in a space, inside said bearing, which is constructed of members being said inner ring, said outer ring, said retainer, and said seal, wherein in at least one of said members constructing said space inside said rolling bearing, an auxiliary agent for said grease is fixed to a surface, of at least one of said members, which is disposed at a side of a space inside said rolling bearing other than a sliding surface, of at least one of said members, on which said rolling elements slide.

TABLE 1

|  | Example | | | | | | | | Comparative example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| Grease | | | | | | | | | | | | |
| Lithium soap/ester oil | ○ | ○ | ○ | — | — | — | ○ | — | ○ | ○ | — | — |
| Urea/(PAO oil + ester oil) | — | — | — | ○ | ○ | ○ | — | ○ | — | — | ○ | ○ |
| Mixing ratio between auxiliary agent and resin (part by weight) | | | | | | | | | | | | |
| Alkylated diphenylamine [1] | 70 | — | — | 70 | — | — | — | — | — | — | — | — |
| Sodium ascorbate [2] | — | 70 | — | — | 70 | — | — | — | — | — | — | — |
| Methylbenzotriazole [3] | — | — | 70 | — | — | 70 | — | — | — | — | — | — |
| Azodicarbonamide [4] | — | — | — | — | — | — | 50 | 50 | — | — | — | — |
| Epoxy resin [5] | 30 | 30 | 30 | 30 | 30 | 30 | 50 | 50 | 100 | — | 100 | — |
| Lifetime of bearing, time (150° C., 10000 rpm) | 540 | 620 | 355 | 2460 | 2880 | 1020 | 330 | 1250 | 142 | 196 | 865 | 422 |

[1] Produced by OUCHI SHINKO CHEMICAL INDUSTRIAL Co., Ltd.: NOCRAC AD
[2] Reagent
[3] Reagent
[4] Reagent
[5] Produced by NICHIBAN Co., Ltd.: Araldite AR-S30

In the examples 1 through 8 in which the mixture of the auxiliary agent for the grease and the resin is fixed to the surface, of the seal, which is disposed at the side of the space inside the bearing, the oxidation deterioration of the grease is prevented and the life of the bearing can be extended.

INDUSTRIAL APPLICABILITY

In the rolling bearing of the present invention, the auxiliary agent such as the antioxidant fixed to the surface of the constructing member melts in the grease and is capable of imparting the efficacy of the auxiliary agent added to the grease to the grease for a long time. Further the gas generated from the auxiliary agent is capable of decreasing the concentration of oxygen present in the space inside the bearing. Thereby the auxiliary agent is capable of extending the life of the rolling bearing. Therefore the rolling bearing of the present invention can be suitably utilized as rolling bearings operated at a high temperature and in a high-speed rotation for car electric parts and auxiliary engine machines such as an alternator, an electromagnetic clutch for a car air conditioner, an idler pulley, an intermediate pulley, an electric fan motor, a fluid coupling, a pump, a distributor, and a starter one-way clutch, and the like; rolling bearings operated at a high temperature and in a high-speed rotation for household appliances such as a cleaner 2. A rolling bearing according to claim 1, wherein said auxiliary agent for said grease is fixed to said surface of at least one of said members with said auxiliary agent contained in a resin.

3. A rolling bearing according to claim 2, wherein said resin is epoxy resin.

4. A rolling bearing according to claim 2, wherein in fixing said auxiliary agent for said grease to said surface of at least one of said members, with said auxiliary agent contained in said resin, a ratio of a weight of said auxiliary agent to a total of a weight of said auxiliary agent and that of said resin is not less than 10 wt %.

5. A rolling bearing according to claim 1, wherein said auxiliary agent for said grease is at least one agent or substance selected from among a foaming agent, an antioxidant, and a sublimate substance.

6. A rolling bearing according to claim 5, wherein said foaming agent is at least one agent selected from among organic foaming agents.

7. A rolling bearing according to claim 6, wherein said organic foaming agent is azodicarbonamide.

8. A rolling bearing according to claim 5, wherein said antioxidant is an amine antioxidant.

9. A rolling bearing according to claim 5, wherein said sublimate substance is at least one substance selected from among benzotriazole and derivatives thereof.

10. A rolling bearing according to claim 1, wherein said auxiliary agent for said grease is fixed to a surface, of said seal, which is disposed at a side of said space inside said bearing.

* * * * *